US011110836B2

(12) United States Patent
Sulaiman et al.

(10) Patent No.: US 11,110,836 B2
(45) Date of Patent: Sep. 7, 2021

(54) VEHICLE SEAT STRUCTURAL COMPONENT AND VEHICLE SEAT (71) Applicant: Faurecia Autositze GmbH, Stadthagen (DE)

(72) Inventors: Hosen Sulaiman, Dortmund (DE); Jörg Vöellmecke, Porta Westfalica (DE); Markus Schenke, Petershagen (DE); Michael Schaper, Petershagen (DE)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 16/920,077

(22) Filed: Jul. 2, 2020

(65) Prior Publication Data
US 2021/0001758 A1 Jan. 7, 2021

(30) Foreign Application Priority Data

Jul. 5, 2019 (DE) ..................... 10 2019 118 258.1

(51) Int. Cl.
*B60N 2/68* (2006.01)
(52) U.S. Cl.
CPC ............ *B60N 2/682* (2013.01); *B60N 2/68* (2013.01)
(58) Field of Classification Search
CPC .................................. B60N 2/68; B60N 2/682
See application file for complete search history.

(56) References Cited

U.S. PATENT DOCUMENTS

| 6,823,575 | B2 * | 11/2004 | Petersen | ............... B21D 39/044 29/509 |
| 8,322,675 | B2 | 12/2012 | Ducreuzot | |
| 8,857,913 | B2 | 10/2014 | Schuhmacher | |
| 9,701,227 | B2 | 7/2017 | Ferenc | |
| 2003/0020306 | A1 * | 1/2003 | Eckendorff | ............... B60N 2/22 297/216.1 |
| 2003/0168897 | A1 * | 9/2003 | Braun | ................... B60N 2/682 297/325 |
| 2008/0251679 | A1 | 10/2008 | Stoia | |
| 2009/0230752 | A1 * | 9/2009 | Adragna | ............... B60N 2/1615 297/463.1 |
| 2009/0314916 | A1 | 12/2009 | Kojima | |
| 2015/0336477 | A1 * | 11/2015 | Matsui | ..................... B60N 2/06 297/344.15 |

(Continued)

FOREIGN PATENT DOCUMENTS

| DE | 102007018101 A1 | 10/2008 |
| DE | 102008025266 A1 | 8/2009 |

(Continued)

*Primary Examiner* — Timothy J Brindley
(74) *Attorney, Agent, or Firm* — Barnes & Thornburg LLP (57) ABSTRACT

A vehicle seat structural component for a vehicle seat includes a structural element, a transverse tube and an intermediate body. The structural element includes an opening. The transverse tube includes an outwardly extending first protrusion. The transverse tube extends through the opening. The intermediate body connects the structural element and the transverse tube. The intermediate body includes a transverse tube supporting section including an inwardly extending first recess. The transverse tube supporting section is supported at the transverse tube such that the first protrusion extends into the first recess and the transverse tube supporting section surrounds the first protrusion.

19 Claims, 7 Drawing Sheets

(56) References Cited

U.S. PATENT DOCUMENTS

| | | | |
|---|---|---|---|
| 2017/0028892 A1* | 2/2017 | Matsui | B60N 2/68 |
| 2017/0101037 A1 | 4/2017 | Ferenc | |
| 2018/0208093 A1* | 7/2018 | Fukuda | B60N 2/68 |
| 2018/0297492 A1 | 10/2018 | Sulaiman | |
| 2021/0001755 A1* | 1/2021 | Sulaiman | B60N 2/1615 |

FOREIGN PATENT DOCUMENTS

| | | |
|---|---|---|
| DE | 102010008676 A1 | 10/2010 |
| DE | 112008004005 T5 | 1/2012 |
| DE | 102013112462 A1 | 5/2015 |
| DE | 102015206461 A1 | 10/2016 |
| DE | 102015219497 A1 | 4/2017 |
| DE | 112016004619 T5 | 7/2018 |
| DE | 102017108206 A1 | 10/2018 |
| EP | 2027951 A1 | 2/2009 |
| EP | 2050613 A1 | 4/2009 |
| FR | 0749867 A1 * | 12/1996 |
| FR | 2772317 A1 | 6/1999 |
| FR | 2831228 A1 | 4/2003 |
| FR | WO-2015033039 A2 * | 3/2015 |
| WO | 2009097945 A1 | 8/2009 |
| WO | 2017060205 A1 | 4/2017 |

\* cited by examiner

VEHICLE SEAT STRUCTURAL COMPONENT AND VEHICLE SEAT

PRIORITY CLAIM

This application claims priority to German Patent Application No. DE 10 2019 118 258.1, filed Jul. 5, 2019, which is expressly incorporated by reference herein.

BACKGROUND

The present disclosure relates to a vehicle seat structural component, particularly one being used in a vehicle seat.

SUMMARY

According to the present disclosure, a vehicle seat structural component may be used in a vehicle seat.

In illustrative embodiments, the structural component includes a structural element, a transverse tube, and an intermediate body. The structural element includes an opening. The transverse tube includes an outwardly extending first protrusion. The transverse tube is designed and arranged to extend through the opening. The intermediate body is designed and arranged to connect the structural element and the transverse tube. The intermediate body includes a transverse tube supporting section including an inwardly extending first recess. The transverse tube supporting section is designed and arranged to be supported at the transverse tube such that the first protrusion extends into the first recess and the transverse tube supporting section surrounds the first protrusion.

In illustrative embodiments, the new vehicle seat structural component is improved in many ways in comparison to comparative vehicle seat structural components. The mechanical stability is increased. For example, this is helpful in case of dynamic permanent stress or a crash or accident. Forces and/or torque are absorbed in a stiff way. The method of manufacturing the structural component may be improved. A connection with greater supporting surfaces may be realized. It is possible to use a transverse tube having comparatively thin walls. The diameter of the transverse tube may be comparatively great. The connection may have an increased fatigue strength.

In illustrative embodiments, the new vehicle seat structural component includes a structural element, a transverse tube and an intermediate body or intermediate element interconnecting the structural element and the transverse tube.

In illustrative embodiments, the structural element may be designed as a vehicle seat side frame element, a guide, a flange, a rocker, an operating element or an operating lever. The structural element includes an opening or a recess through which the transverse tube extends. The transverse tube is fixedly connected to the structural element by the intermediate body.

In illustrative embodiments, a connection between the intermediate body and the transverse tube is realized by the intermediate body. The intermediate body is axially and/or radially supported at the transverse tube. Thus, it is possible to transmit torque between the transverse tube and the intermediate body.

In illustrative embodiments, the transverse tube includes a first protrusion. The intermediate body includes a transverse tube supporting section by which the intermediate body is supported at the first protrusion. The transverse tube supporting section is formed such that it extends about the first protrusion, i. e. it surrounds or covers the first protrusion. This especially applies to a semi longitudinal sectional view. For example, this may mean that the transverse tube supporting section of the intermediate body extends in an axial direction in front of and behind the first protrusion of the transverse tube. In this way, the first protrusion is captivated in an axial direction in the transverse tube supporting section. This may be realized with a clearance, without a clearance or even under axial tensioning.

In illustrative embodiments, because the transverse tube supporting section extends about the first protrusion, it is also possible that the first protrusion is captivated in a radial direction in the transverse tube supporting section. This may also be realized with a clearance, without a clearance or even under radial tensioning. In this way, a reliable connection between the transverse tube and the intermediate body is realized. This applies independently from a possible otherwise connection between the intermediate body and the structural element.

In illustrative embodiments, there is a number of different possibilities for the design and shape of the transverse tube supporting section of the intermediate body. It is intended to attain the desired supporting effect and to provide that the transverse body supporting section surrounds the first protrusion.

In illustrative embodiments, the transverse tube supporting section of the intermediate body has the shape of an U as seen in a semi longitudinal sectional view. It is possible that the U is inverted depending on how the section is made. In this case, the first protrusion of the transverse tube is captively arranged between the side legs or bars of the U. The base leg of the U extends radially outwardly from the first protrusion. It is also possible that the side legs of the U are not arranged to be exactly parallel with respect to one another and/or the base leg and/or the side legs of the U is/are rounded or has/have any other curved design.

In illustrative embodiments, it is possible that the connection between the intermediate body and the transverse tube is only realized in the region of the transverse tube supporting section. Consequently, the required forces and torque can be accepted and transmitted in the region of the transverse tube supporting section.

In illustrative embodiments, another possibility is that a sleeve section is located at the intermediate body next to the transverse tube supporting section of the intermediate body in an axial direction. The transverse tube contacts the sleeve section of the intermediate body in a radial inward region. This may be realized with a clearance fit, a transition fit or a press fit. By this sleeve section, an additional supporting surface between the intermediate body and the transverse tube can be provided. Depending on the axial extension of the sleeve section, this additional supporting surface can provide a solid support of torque acting upon a transverse axis with respect to the transverse tube. It is also possible to transmit radial forces by the contact surface between the sleeve section of the intermediate body and the transverse tube with comparatively small surface pressure. Depending on the load and the dimensioning, torque can be transmitted between the intermediate body and the transverse tube by the transverse tube supporting section and/or the sleeve section.

In illustrative embodiments, it is possible that two axial sleeve sections of the intermediate body are located next to the transverse tube supporting section of the intermediate body at opposite sides. The transverse tube then contacts the axial sleeve sections in a radial inward direction. In this way, an even stiffer support between the intermediate body and the transverse tube can be realized.

The above-described measures concern the design of and the connection between the intermediate body and the transverse tube. These measures may also be applied to any other connection between the intermediate body and the structural element. Other aspects concern the design of the connection between the intermediate body and the structural element as this will be described herein below.

In one embodiment of the vehicle seat structural component, a second protrusion is located next to one end of the sleeve section. For example, the second protrusion is designed as a collar. In this case, the structural element may be captively arranged between the transverse tube supporting section of the intermediate body and the second protrusion of the intermediate body. This may be realized with a clearance, without a clearance or under axial tensioning. In this way, at least an axial securing effect between the intermediate body and the structural element is realized. In addition, there may be a radial support of the intermediate body at the structural element. In case of radial tensioning of the intermediate body in the structural element and/or axial tensioning of the structural element between the second protrusion element of the intermediate body and the transverse tube supporting section of the intermediate body, forces can be transmitted between the intermediate body and the structural element by friction.

It is possible that there is a rotational degree of freedom between the structural element and the intermediate body and/or the intermediate body and the transverse tube in the vehicle seat structural component. It is possible that a rotational degree of freedom is prevented by effective tensioning and the frictional forces resulting therefrom.

For realizing a non-rotatable connection between the intermediate body and the transverse tube, it is possible to provide a form fit connection. Alternatively or additionally, a non-rotatable connection between the intermediate body and the structural element may be realized by a form fit connection. In this case, the axial protrusions and associated recesses exist. In this case, an axial protrusion engages into an associated recess by form fit. In this way, an especially reliable rotation lock is provided.

The first protrusion of the transverse tube may have any design. Preferably, it is designed as a folded element of the transverse tube. For example, the folded element may be designed as an U as seen in a semi longitudinal sectional view. Depending on the section of the semi section, the U may be inverted. The side legs of the U may be located directly next to one another or they may be spaced apart from one another.

There are many possibilities of producing the vehicle seat structural component. One possibility is to create the first protrusion, the first recess, the transverse tube supporting section, the second protrusion and/or the second recess by elastic-plastic deformation. For example, it is possible that a sleeve-shaped semi-finished version of the intermediate body is pushed onto the transverse tube and the transverse tube together with the intermediate body is introduced into a recess of the structural element. The sleeve and the transverse tube are then tensioned by two tools at both sides of the structural element. By an axial movement of the tools towards one another, the first protrusion of the transverse tube and the transverse tube supporting section of the intermediate body are produced in one single deforming step. In addition, the second protrusion being located at the end of the transverse tube between which the structural element is tensioned is also produced thereby. In this deforming process, it is possible to simultaneously produce axial protrusions and/or impressions or recesses realizing a form fit serving for a rotation lock.

The first and second protrusion may be produced by an elastic-plastic deformation of the transverse tube in a radial outer direction. For example, the protrusions may be a bulge, a bead and/or a folded portion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
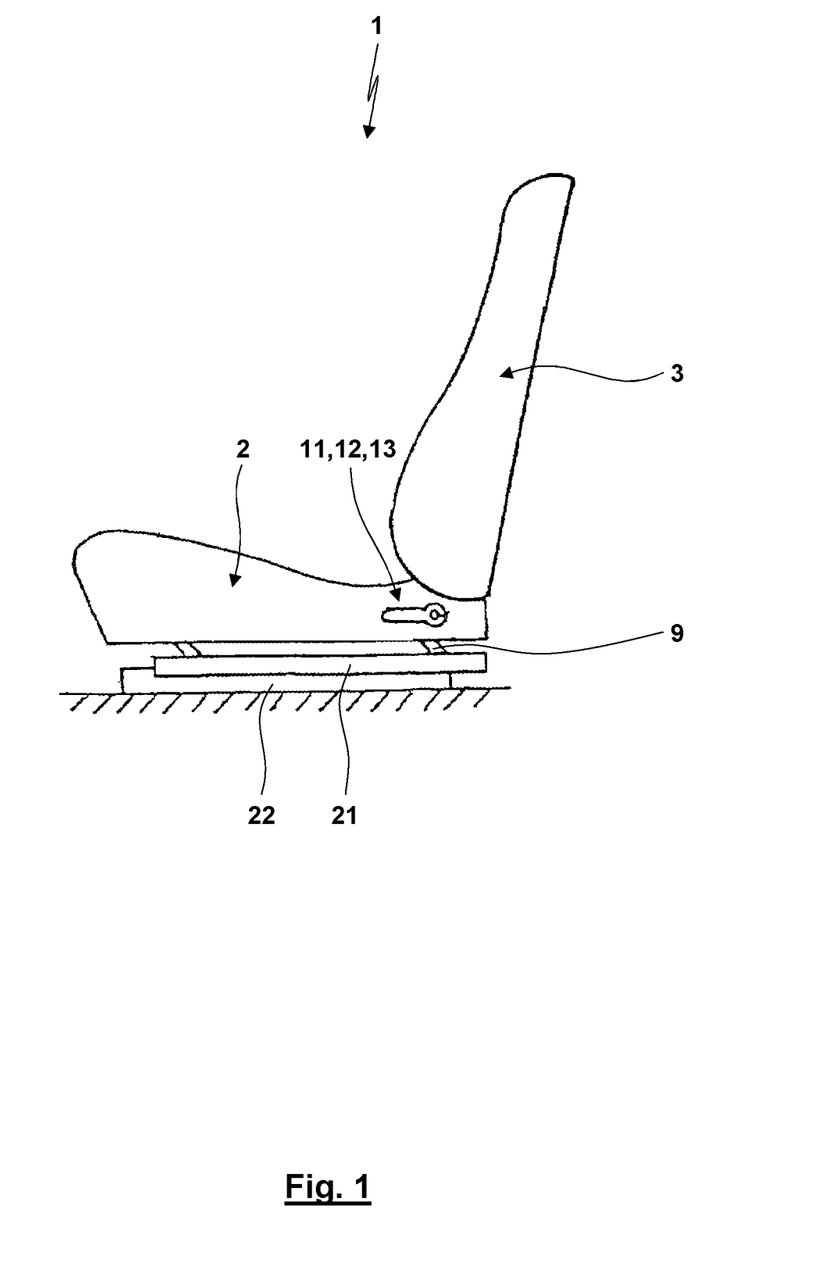
FIG. 1 illustrates a schematic side view of an exemplary embodiment of a new vehicle seat.

Referring now in greater detail to the drawings, FIG. 1 illustrates a schematic side view of a vehicle seat 1 serving to be used in any vehicle, especially a motor vehicle such as a car, a utility vehicle or a truck. The vehicle seat 1 includes a seating portion 2 and a backrest 3 being connected to the seating portion 2. The angle of inclination of the backrest 3 with respect to the seating portion 2 can be adjusted by an adjusting unit for the angle of inclination (not illustrated).

Figure 2:
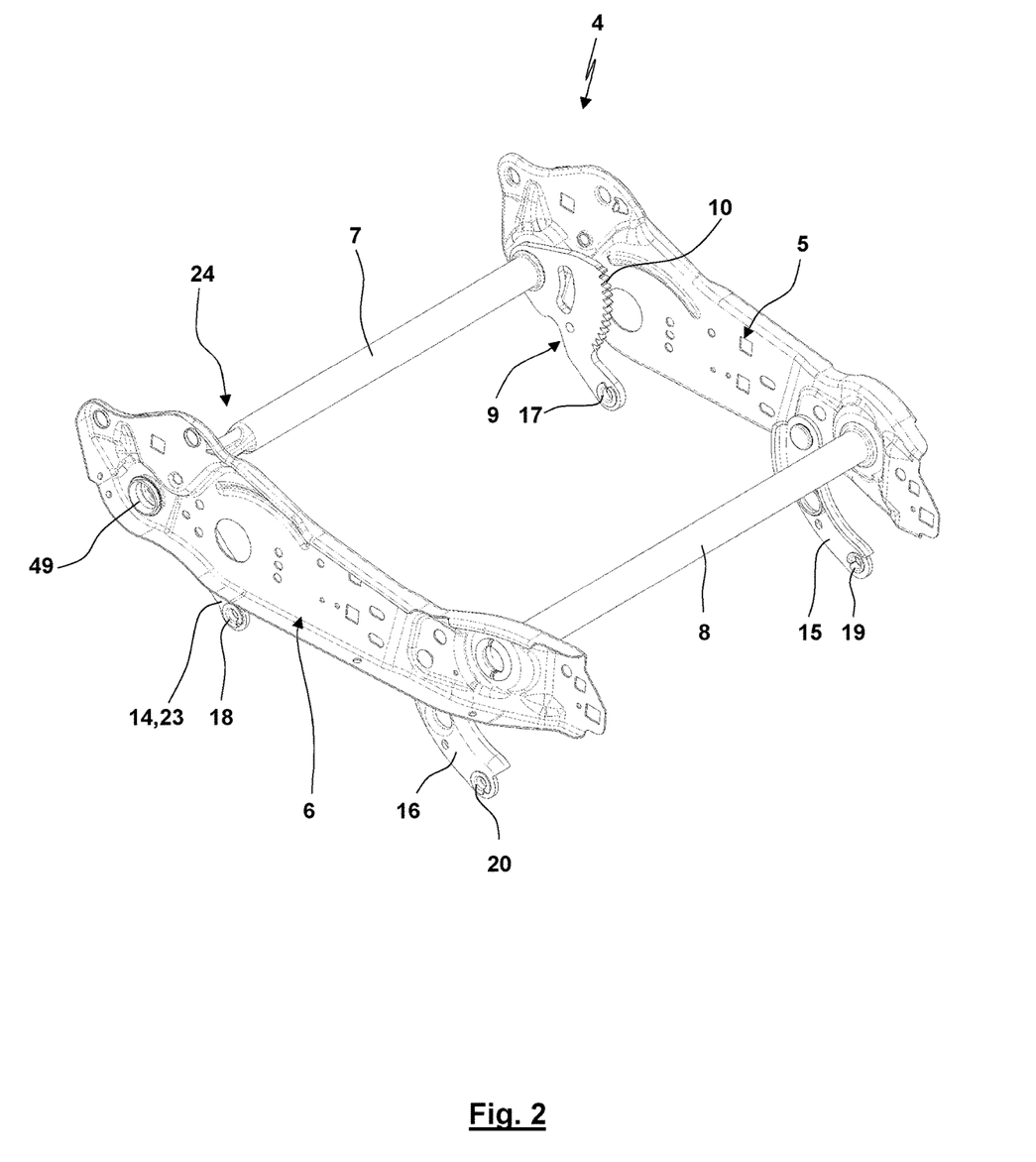
FIG. 2 illustrates a perspective view of a vehicle seat structure of a vehicle seat according to FIG. 1.

The seating portion 2 includes a frame-like vehicle seat structure 4 being illustrated in FIG. 2. Components of the seating portion 2 such as the seat cushion, aggregates (such as a heating unit and/or a ventilating unit), actuating motors and the backrest 3 are supported at the vehicle seat structure 4.

The vehicle seat structure 4 includes vehicle seat side frame elements 5, 6 being arranged to be parallel with respect to one another and to extend in the longitudinal direction of the vehicle. The side frame elements 5, 6 are interconnected by transverse tubes 7, 8 being arranged to be parallel to one another and to extend in the transverse direction of the vehicle. Consequently, in a top view, the vehicle seat structure 4 has a rectangular shape. As it is to be seen in FIG. 2, the vehicle seat side frame elements 5, 6 protrude beyond the transverse tubes 7, 8 in the longitudinal direction of the vehicle.

The rear transverse tube 7 is rotatingly supported in the vehicle seat side frame elements 5, 6. A height adjustment rocker 9 is non-rotatably connected to the rear transverse tube 7. The rocker 9 forms some sort of a guide. The height adjustment rocker 9 includes external teeth 10. The external teeth 10 are associated with a height adjustment unit 11 in the vehicle seat 1. The height adjustment unit 11 includes a drive element 12 being designed as a manually operable operating element 13 (especially an operating lever) in the illustrated example. However, it is also possible that the drive element 12 is designed as an electric drive being manually actuated by a switch, a slide and so forth. Drive torque is created by the drive element 12 and it is applied onto the outer teeth 10 of the height adjustment rocker 9 resulting in pivoting of the height adjustment rocker 9 and of the rear transverse tube 7. Adjacent to the other vehicle seat side frame portion 6, another rocker or a guide 14 is non-rotatably connected to the rear transverse tube 7.

The front transverse tube 8 is non-rotatably connected to the vehicle seat side frame elements 5, 6. Adjacent to the connection of the front transverse tube 8 to the vehicle seat side frame elements 5, 6, guides 15, 16 are connected to the vehicle seat side frame elements 5, 6 to be rotatable about a transverse axis.

The free end portions of the height adjustment rocker 9 as well as of the guides 14, 15, 16 each include bearing portions 17, 18, 19, 20 in the region of which the height adjustment rocker 9 and the guides 14, 15, 16 are pivotably supported at parallel longitudinal bars 21 being arranged at both sides of the vehicle seat 1 and extending in the longitudinal direction. The longitudinal bars 21 can slide with respect to the bottom bars 22 in the longitudinal direction of the vehicle when actuating a known adjustment mechanism (see FIG. 1). The height adjustment rocker 9 and the guides 14, 15, 16 form a parallelogram guidance by which, when the height adjustment rocker 9 is rotated, torque being applied onto the outer teeth 10 causes lifting and lowering of the transverse tubes 7, 8. Thus, lowering and lifting of the vehicle seat structure 4 and of the entire vehicle seat 1 can be realized in this way.

The transverse tube 7, a structural element 23 and an intermediate body 7 form a vehicle seat structural component 24. In the illustrated exemplary embodiment, the vehicle seat structural component 24 is designed as the guide 14.

FIGS. 3 to 7 illustrate the vehicle seat structural component 24 in the region of a rigid connection 25 between the transverse tube 7 and the structural element 23. The structural element 23 includes an opening 26 through which the transverse tube 7 extends. The intermediate body 27 is arranged in the opening 26 and between the structural element 23 and the transverse tube 7 to interconnect them. The intermediate body 27 is designed as a sleeve being elastically-plastically deformed, having the shape of a hollow cylinder and being especially made of metal.

Figure 7:
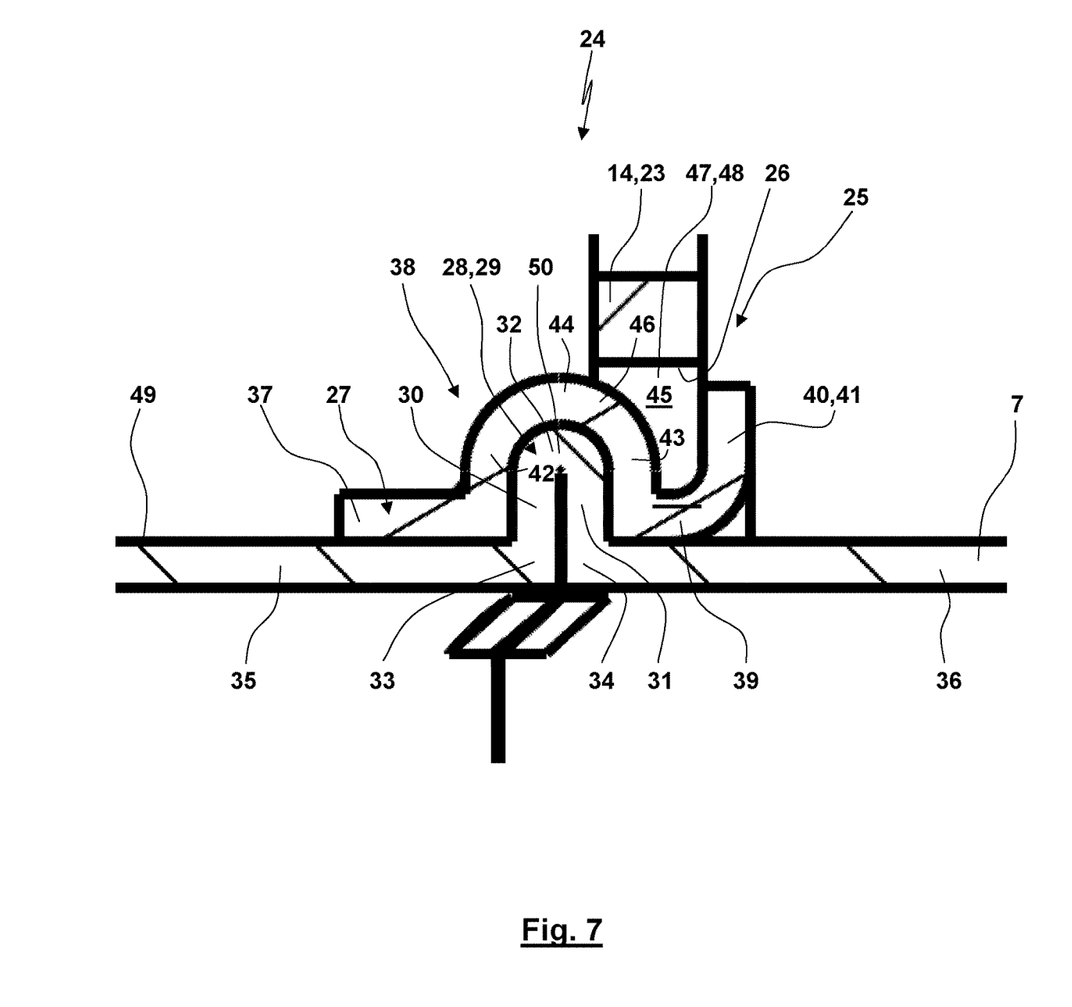
FIG. 7 illustrates a detail VII of the vehicle seat structural component according to FIG. 6.

As it is to be best seen in the detail VII in FIG. 7, the transverse tube 7 includes a first protrusion 28. In this case, the first protrusion 28 is designed as a folded arched element 29. In the semi sectional view of FIG. 7, the folded arched element 29 has the shape of an inverted U. It includes side legs 30, 31 each forming some sort of an annular collar of the transverse tube 7. The side legs 30, 31 are interconnected by a base bar 32. In this case, the base bar 32 is designed to be bent in an approximately semicircular shape. The side legs 30, 31 extend parallel to one another and in a radial direction, and they are located directly next to one another. Via folded portions 33, 34, the side legs 30, 31 merge into the tubular adjacent sections 35, 36 of the transverse tube 7 in radial inner end portions.

The intermediate body 27 includes a sleeve section 37, a transverse tube supporting section 38 including an inwardly extending first recess 50, a sleeve section 39 and a second protrusion 40. In this case, the second protrusion 40 is designed as a collar 41. These sections are located in the mentioned order and directly next to one another as seen in the axial direction.

In the semi sectional view of FIG. 7, the transverse tube supporting section 38 is designed as an inverted U. This means that it is opened towards the transverse tube 7. The first protrusion 28 is arranged in the first recess 50 of the U, and it is clamped therein axially and/or radially. The U of the transverse tube supporting section 38 is formed by side legs 42, 43 being interconnected by a base leg 44. In the present case, the base leg 44 is designed to be curved and especially semi-annular. The free end portions of the side legs 42, 43 merge into the sleeve sections 37, 39 by rectangular folded portions. The side legs 42, 43 of the transverse tube supporting section 38 contact the side legs 30, 31 of the first protrusion 28 axially from the outside. Preferably, this is realized under the influence of pretensioning. The first protrusion 28 is thus captively arranged in an axial direction in the recess 50 of the transverse tube supporting section 38 between the side legs 42, 43. The base leg 44 of the transverse tube supporting section 38 is shaped to correspond to or to be congruent to the base leg 32 of the first protrusion 28. The base leg 44 contacts the base leg 32 of the first protrusion 28 in a radial direction. This may also be realized under the influence of radial pretensioning. Tubular sections 35, 365 of the transverse tube 7 are arranged inside of the sleeve sections 37, 39 without clearance or under radial pretensioning.

Since the first protrusion 28 of the transverse tube 7 is supported in the transverse tube supporting section 38, since the tubular section 35 of the transverse tube 7 is supported in the sleeve section 37 and since the tubular section 36 of the transverse tube 7 is supported in the sleeve section 39, the intermediate body 27 is fixedly arranged at the transverse tube 7. The fixation allows for transmittal of axial forces, radial forces and torque acting about the transverse axis of the transverse tube 7. Some sort of a continuous channel 45 is formed between the transverse tube supporting section 38 and the second protrusion 40. The structural element 33 is captively arranged and fixed in the channel 45. For this purpose, it is possible that the structural element 23 is tensioned in an axial direction between the second protrusion 40 and the transverse tube supporting section 38. In this way, due to friction resulting therefrom, there is a securing effect and a certain rotation lock between the intermediate body 27 and the structural element 23.

It is possible that the opening 26 is designed as a cylindrical bore. In this case, the second protrusion 40 and the side leg 43 of the transverse tube supporting section 38 may contact the structural element 23 over the entire circumference in the region around the opening 26. In case of the illustrated exemplary embodiment, however, the opening 26 does not have a circular cross section. Instead, the opening 26 has a non-round cross section. The second protrusion 40 and/or the transverse tube supporting section 38 are deformed such that they form axial protrusions 46. The axial protrusions 46 may enter into an impression in the structural element 23 or a recess 48 of the opening 26. In this way, a rotation lock based on form fit is realized.

Figure 3:
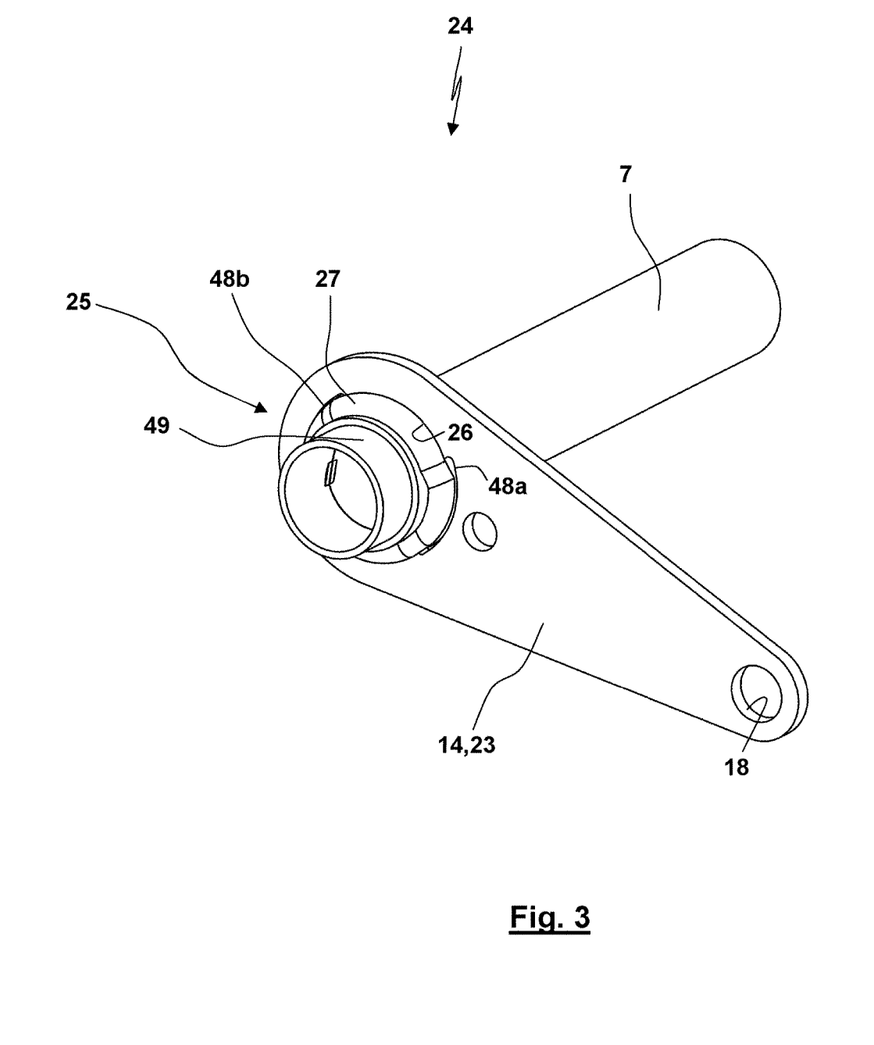
FIG. 3 illustrates a perspective view of a vehicle seat structural component in the region of a non-rotatable connection between a transverse tube and a structural element as seen at an angle from the outside.
Figure 4:
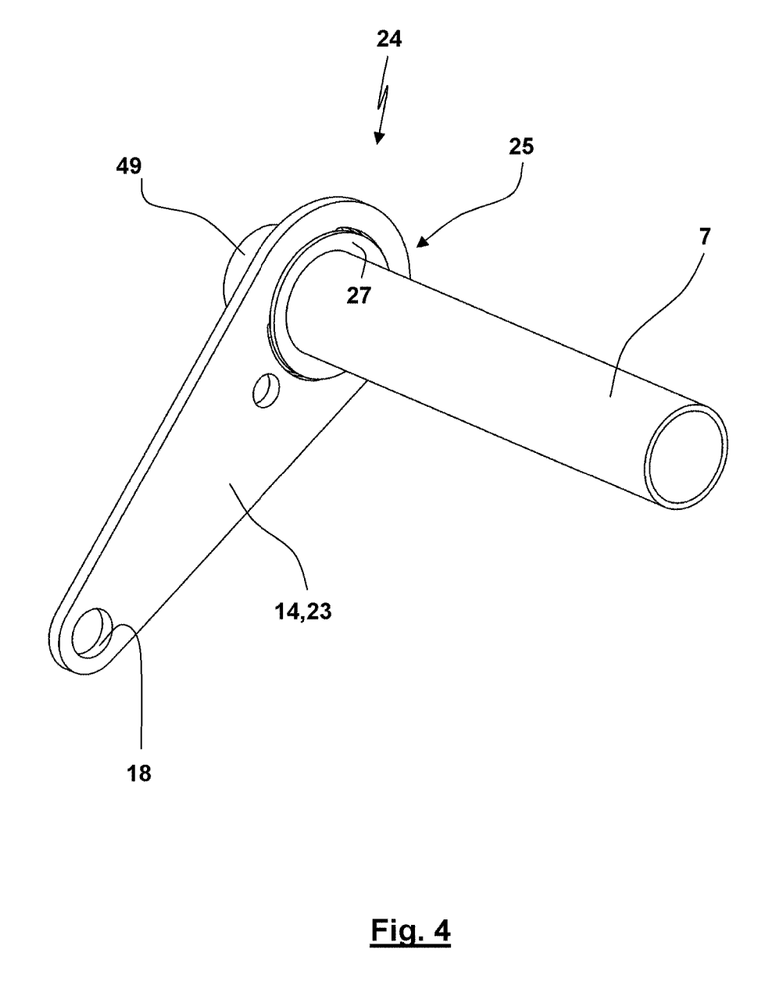
FIG. 4 illustrates another perspective view of the vehicle seat structural component according to FIG. 3 as seen from an angle from the inside.
Figure 5:
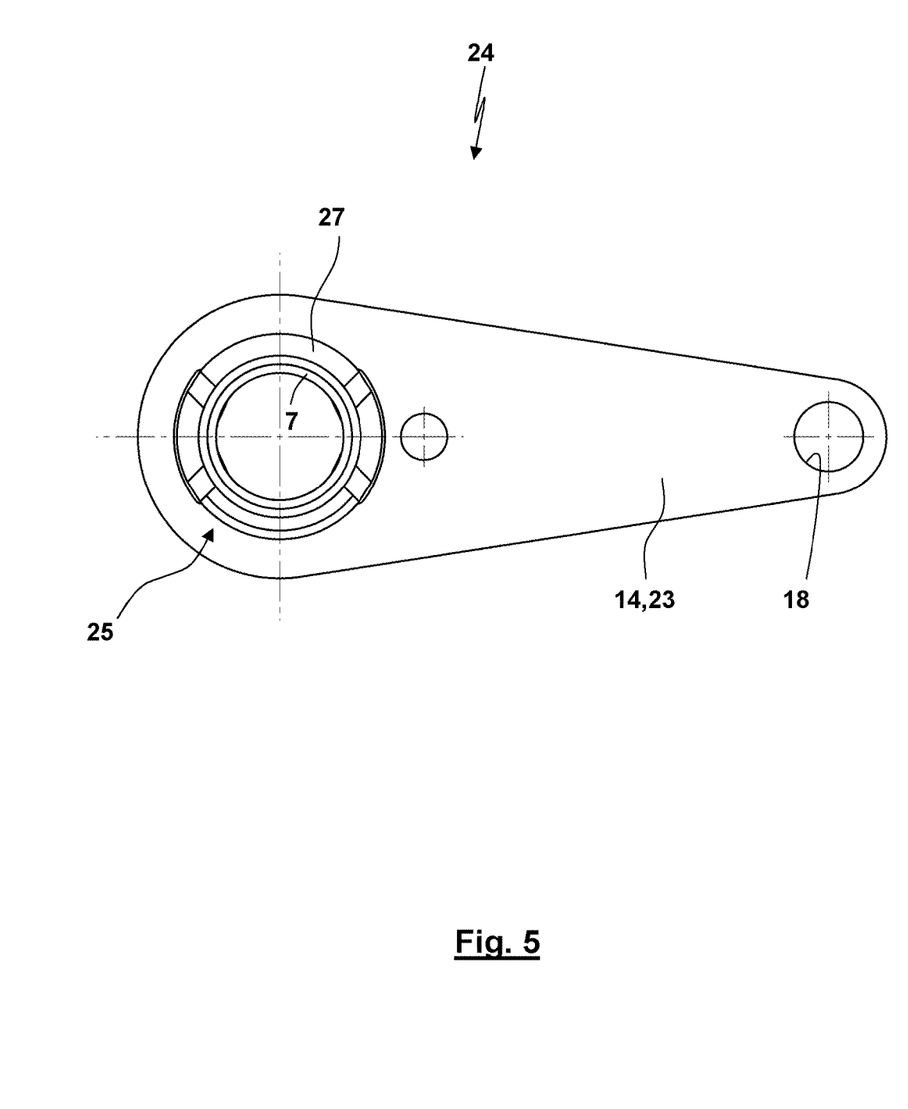
FIG. 5 illustrates a front view of the vehicle seat structural component according to FIGS. 3 and 4.
Figure 6:
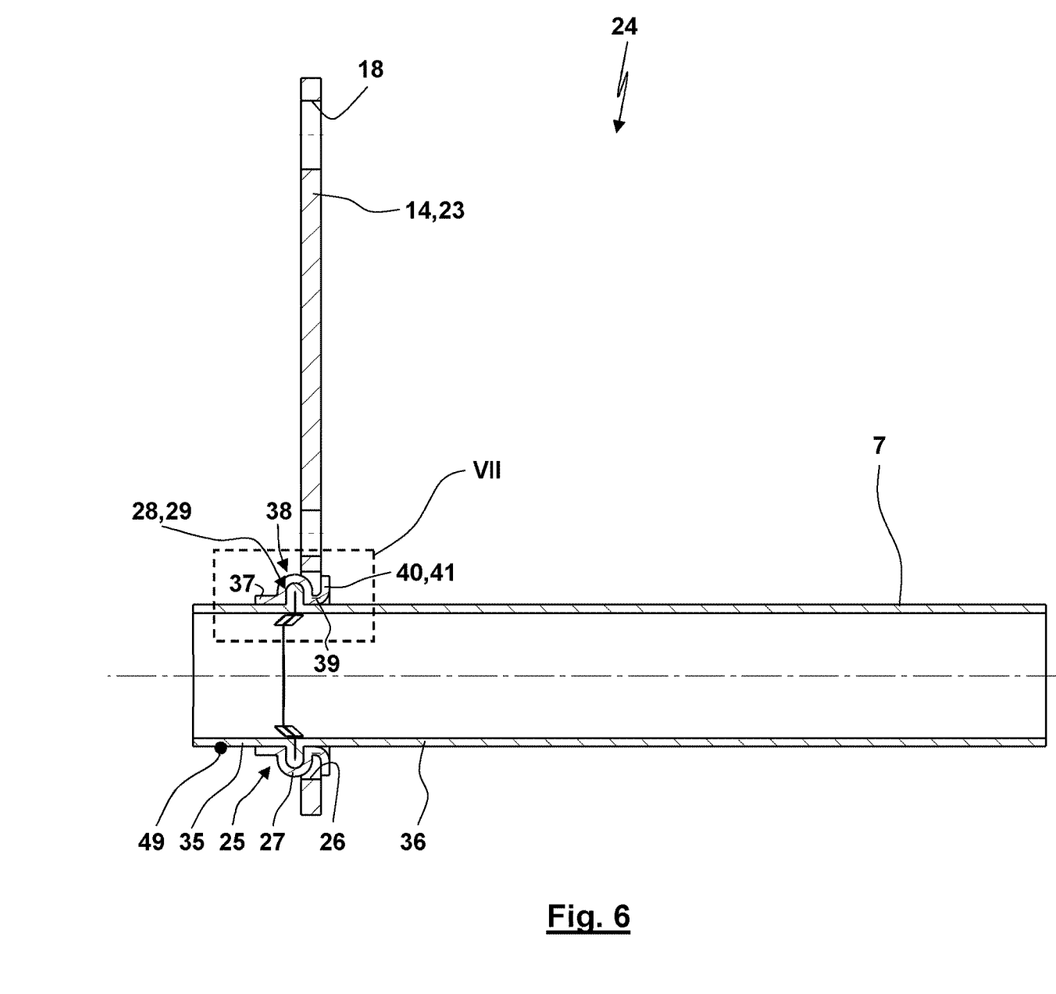
FIG. 6 illustrates a longitudinal sectional view of the vehicle seat structural component according to FIGS. 3 to 5.

As it is to be especially seen in FIG. 3, the illustrated exemplary embodiment includes two recesses 48a, 48b. The cross section of the opening 26 deviates from a circular cross section in the region of these recesses 48a, 48b. In the present case, the recesses 48a, 48b are arranged at the opening 26 in a diametrically opposed way. Away from the recesses 48a, 48b, the transverse tube supporting section 38 extends in a first transverse plane, while in the region of the recesses 48a, 48b, the transverse tube supporting section 38 is formed axially into the recesses 48a, 48b such that the transverse tube supporting section 38 extends in a second transverse plane in a partial circumferential portion being associated with the recesses 48a, 48b.

Together with forming of the transverse tube supporting section 38 into the recesses 48a, 48b, the first protrusion 28 of the transverse tube 7 is deformed. Consequently, the first protrusion 28 does not extend in only one transverse plane as an even continuous collar, but instead the first protrusion 28 is arranged remote from the recesses 48a, 48b and in the region of the recesses 48a, 48b in a second spaced apart transverse plane.

If one observes the transverse tube 7 and the intermediate body 27 in a developed view, the transverse tube supporting section 38 and the first protrusion 28 are not oriented straight in the transverse direction, but instead they are designed as a meander or to extend back and forth in the transverse direction. The axial protrusions 46 formed in this way are arranged in the region of the recesses 48a, 48b and at least partly extend into these axially.

In the illustrated exemplary embodiment, the opening 26 has an unround cross section, while the extensions of the cross section are formed by the recesses 48a, 48b. In this case, the recesses 48a, 48b form an axial impression 47 into which the axial protrusion 46 being formed by the transverse tube supporting section 38 can enter. However, it is also possible that the opening 26 is designed to be cylindrical and that the structural element 23 in the region close to the opening 26 includes an axial impression 47, for example an axial bore or a different recess, into which material of the transverse tube supporting section 38 or of the second protrusion 40 can be formed. On the other hand, it is also possible that the structural element 23 in the region close to the opening 26 includes an axial protrusion. In this case, the transverse tube supporting section 38 is deformed such that it forms this recess. The protrusion being formed by the structural element 23 may be supported in this recess under form fit.

It is possible that the free end portion of the transverse tube 7 being formed by the tubular section 35 forms a supporting surface or a connection section 49. The transverse tube 7 (and thus also the structural element 23) is rotatably supported in the vehicle seat side frame portion 6 in this region.

Without deviating from the spirit of the present disclosure, the transverse tube 7 may have any unround shape and/or any curved longitudinal axis.

By way of example only, the fixation of the transverse tube 7 at the guide 14 has been explained by the fixation of the transverse tube 7 at the structural element 23 via the intermediate body 27. However, it is also within the scope of the present disclosure to fix any structural element at any transverse tube by using the intermediate body 27 as it has been described. For example, it is also possible that the transverse tube 8 is connected to the vehicle seat side frame elements 5, 6 and/or the transverse tube 7 is connected to the height adjustment rocker 9 by the connection technology described above.

In this detailed description, some of the components having the same or a similar function and/or shape have been designated with the same reference numeral at the end of which the letter "a" or "b" has been added for reasons of differentiation. It is also referred to these components without the added letter "a" or "b". In this case, the associated statements may relate to some or all of these components.

The present disclosure relates to a vehicle seat structural component being used in a vehicle seat. The vehicle seat structural component includes a structural element and a transverse tube being interconnected.

For example, the vehicle seat structural component may be a part of a vehicle seat frame or a vehicle seat substructure. It is also possible that the structural element is a guide which, when being pivoted, results in height adjustment of the vehicle seat. Another non-limiting example of the structural element is an operating element such as an operating lever which, when being actuated, results in rotation of the transverse tube by an actuator or by the operator. In this way, it is possible to adjust the vehicle seat. The structural element may also be designed as a vehicle seat side frame element.

A comparative height adjustment unit of a vehicle seat includes a rear transverse tube the end portion of which is rotatably supported in supports of parallel vehicle seat side frame elements. Adjacent to the supports in the vehicle seat side frame elements, structural elements being designed as guides are located at the transverse tube. The guides include bores through which the transverse tube extends. In the free end portions, the supports are rotatably supported in parallel longitudinal bars which are slidable in a horizontal direction. Pivoting of the guides can be caused by a height adjustment pump and a sprocket being driven thereby. This results in the transverse tube being lifted with respect to the longitudinal bar and thus the vehicle seat side frame elements and the vehicle seat being lifted. This comparative height adjustment unit proposes to form two continuous beads in the transverse tube, the guides being axially captivated and tensioned between the beads. During manufacture of the outer beads, the material of the transverse tube is also widened in a radial outer direction in the inside of the bore of the guide through which the transverse tube extends. In this way, one attains a frictional non-rotatable connection between the transverse tube and the guide.

A comparative vehicle seat including a comparative structural component being designed as a guide. The comparative guide is non-rotatably connected to a front transverse tube by the transverse tube being deformed to have an unround cross section in the connection region. The comparative guide having a corresponding unround recess is pushed on this unround cross section. As seen in the pushing direction, the guide contacts a shoulder of the transverse tube, the shoulder being formed in a transition region of the undeformed annular cross section of the transverse tube and the unround deformed axial section. The unround end portion protruding from the guide is then elastic-plastically deformed outwardly. In this way, the guide is also secured axially in a direction opposite to the pushing direction. The unround cross section of the transverse tube as well as of the recess of the guide may be designed as a flattened portion or as an impression or to have a polygonal cross section. By this shape, the orientation of the transverse tube with respect to the guide is predetermined. For a different comparative embodiment, it is proposed to arrange a continuous bead-like element in the transition region. This element forms the shoulder of the transverse tube at which the bead is supported in the pushing direction. It is also proposed in this document that—in addition to the fixation of a bead as it has been described above—a bearing acting between the transverse tube and a vehicle seat side frame portion is formed at the guide. This is realized by the vehicle seat side frame element including a bearing bore in which a cylindrical surface shelf of the transverse tube is rotatably arranged. The vehicle seat side frame element is axially captivated between the shaped element forming the support for the guide and another deformed element.

Fixation of a comparative structural element being designed as a guide at a front transverse tube of a vehicle seat. The comparative guide includes a conical insertion inclination having notches being distributed about the circumference. The inner radius of the insertion conus is smaller than the outer radius of the transverse tube. When the transverse tube is pressed into the insertion conus of the guide and through it, this results in elastic-plastic deformation of the end portion of the transverse tube. During this deformation, material of the transverse tube remains in the distributed notches. In this way, a non-rotatable connection of the transverse tube and the guide is realized. The end portion protruding from the guide is then expanded in a radial direction. This results in exiting of the transverse tube from the guide against the pushing direction is stopped.

A comparative non-rotatable connection made of a metal tube and a comparative guide made of sheet metal is made according to a method. A shaped element is produced at the tube spaced apart from the end portion. The guide including a recess is then pushed onto the end of the tube until it contacts the shaped element. At the outer side, another shaped element is produced such that the guide is captively arranged between the two shaped elements. The recess of the guide is designed to be unround and it includes radial recesses being spaced apart the circumference. For realizing a non-rotatable connection, the shaped element of the tube is axially deformed in the region of the recesses such that the material of the shaped element of the tube enters into the recesses of the guide in an axial direction. In this way, a form fit providing for the non-rotatable connection is realized.

A comparative guide is captively arranged in an axial direction between two shaped elements of a transverse tube. The sheet metal includes an unround recess having radial openings. Form fit in a circumferential direction is not realized by axially deforming the shaped elements into the openings. Instead, the transverse tube is radially deformed towards the outside in the interior of the openings and it is deformed into the openings in a radial direction in this way.

A direct connection between the transverse tube and the structural element may be done in comparative devices. However, the connection between the transverse tube and the structural element by an intermediate arrangement of an intermediate body may be done in comparative devices.

A comparative intermediate body being designed as a bearing bush between a sleeve-shaped protrusion of a vehicle seat side frame element and a transverse tube. The free face of the sleeve-like protrusion of the vehicle seat side frame element and the bearing bush are supported at a folded protrusion of the transverse tube in an axial direction. In the other axial direction, the vehicle seat side frame element is supported at a collar of the bearing bush. The bearing bush is fixed in this other axial direction at the shell surface of the transverse tube by a securing ring. In addition, the free end portion of the transverse tube includes a shaped element the diameter of which is greater than the inner diameter of the bearing bush and of the bore of the sleeve-like protrusion of the vehicle seat side frame element such that a redundant securing effect is realized in this axial direction.

A comparative intermediate body may be designed as a bearing bush and being designed to be L-shaped as seen in a semi longitudinal sectional view. The vertical bar of the L forms a first collar. The horizontal bar of the L includes a supporting portion and a free end portion. Nose-shaped spreading elements extending radially towards the inside are arranged at the free end portion. A structural element being designed as a vehicle seat side frame element includes a bore into which the bearing bush is inserted such that the collar of the bearing bush is axially supported at the inside of the vehicle seat side frame element and the bearing bush with the supporting portion is radially supported at the bore of the vehicle seat side frame element. A transverse tube is then introduced into the bearing bush. Due to the inserting movement, the transverse tube spreads the free end portion of the bearing bush by the spreading elements radially towards the outside. In this way, the free end portion of a second collar is formed. This second collar is initially oriented in a radial outer direction under an angle of 45°. As seen in the inserting direction, a folded protrusion of the transverse tube then contacts the first collar. An end portion of the transverse tube protruding from the bearing bush is then conically expanded. This results in the second collar being further bent until it is oriented transverse to the longitudinal axis of the transverse tube. The bearing bush is then captively arranged between the folded protrusion and the conical expansion.

A comparative rotatable slide bearing support of an end portion of a tube serving for unlocking in a carrier using an intermediate body of a thermoplastic polymer material. The intermediate body has the shape of a horizontal L as seen in a semi longitudinal sectional view. The vertical bar of the horizontal L forms a flange with which the intermediate body is axially supported at the carrier. The horizontal bar of the horizontal L extends through a bore of the carrier. At its end, it merges into a wave form having two wave throughs. The associated end portion of the tube has a corresponding wave form. The slide bearing formed in this way has two different operational position: In the first operational position, the tube fully contacts the inner bore of the flange and the wave-formed horizontal bar of the horizontal L. In this first operational position, the intermediate body allows for the rotation of the tube with respect to the carrier. Furthermore, an axial displacement of the intermediate body with the tube being arranged therein is possible in the direction in which the flange departs from the carrier. In contrast, in the second operational position, the face of the horizontal bar of the horizontal L is supported at the outer wave crest of the tube being arranged therein. The horizontal bar of the horizontal L is then compressed in the axial direction such that it forms two wave crests being located close to one another the outer diameter of which is greater than the inner diameter of the bore of the carrier. In this second operational position a rotation between the tube and the carrier is also possible. However, the axial degree of freedom of the tube with respect to the carrier is limited by the carrier being captively arranged in an axial direction between the flange of the intermediate body and the wave crest of the intermediate body facing towards the flange.

A comparative vehicle seat structural component serving for an adjustment of the height of the vehicle seat. A structural element being designed as a connecting rod includes a bore having internal teeth. An end portion of a transverse tube extends through the bore. The transverse tube is commonly pressed with the connecting rod by an axial compression such that the limiting portion of the bore of the connecting rod is axially clamped between two folded protrusions. The protrusions also enter into the intermediate spaces between the teeth of the bore such that a rotation lock is realized. In the outer end portion, the transverse tube merges via a shoulder into a tubular protrusion having a decreased diameter. In the region of the tubular protrusion, the transverse tube is rotatably supported at lateral flanges of the frame of the vehicle seat by sliding bushes.

The invention claimed is:

1. A vehicle seat structural component for a vehicle seat, comprising:
 a structural element, the structural element including an opening;
 a transverse tube, the transverse tube including an outwardly extending first protrusion, the transverse tube being designed and arranged to extend through the opening; and
 an intermediate body, the intermediate body being designed and arranged to connect the structural element and the transverse tube, the intermediate body including a transverse tube supporting section including an inwardly extending first recess, the transverse tube supporting section being designed and arranged to be supported at the transverse tube such that the first protrusion extends into the first recess and the transverse tube supporting section surrounds the first protrusion.

2. The vehicle seat structural component of claim 1, wherein the transverse tube supporting section has the shape of a U.

3. The vehicle seat structural component of claim 1, wherein the transverse tube supporting section surrounds the first protrusion such that the intermediate body is supported at the first protrusion in two axial directions.

4. The vehicle seat structural component of claim 1, wherein the transverse tube supporting section surrounds the first protrusion such that the intermediate body is supported at the first protrusion in a radial inward direction.

5. The vehicle seat structural component of claim 1, wherein the transverse tube supporting section surrounds the first protrusion such that the intermediate body is supported at the first protrusion in two axial directions; and the intermediate body is supported at the first protrusion in a radial inward direction.

6. The vehicle seat structural component of claim 1, wherein the transverse tube supporting section includes a sleeve section, the sleeve section being designed and arranged to surround the transverse tube in a region where the first protrusion is not located.

7. The vehicle seat structural component of claim 6, wherein the intermediate body includes a second outwardly extending protrusion, the second protrusion being arranged next to the sleeve section; and the structural element is arranged between the first protrusion and the second protrusion to be captivated in an axial direction.

8. The vehicle seat structural component of claim 1, wherein the transverse tube supporting section has a first axial end and an opposed second axial end; and the transverse tube supporting section includes a first sleeve section and a second sleeve section, the first sleeve section being arranged at the first axial end, the first sleeve section being designed and arranged to surround the transverse tube in a region where the first protrusion is not located, the second sleeve section being arranged at the second axial end, and the second sleeve section being designed and arranged to surround the transverse tube in a region where the first protrusion is not located.

9. The vehicle seat structural component of claim 8, wherein the intermediate body includes a second outwardly extending protrusion, the second protrusion being arranged next to the second sleeve section; and the structural element is arranged between the first protrusion and the second protrusion to be captivated in an axial direction.

10. The vehicle seat structural component of claim 9, wherein the intermediate body and the structural element are fixedly connected to one another such that they cannot be rotated with respect to one another.

11. The vehicle seat structural component of claim 10, wherein the intermediate body and the structural element are connected to one another by a form fit connection.

12. The vehicle seat structural component of claim 11, wherein
 the intermediate body includes a second outwardly extending protrusion; and
 the structural element includes a second inwardly extending recess, the second protrusion and the second recess forming the form fit connection.

13. The vehicle seat structural component of claim 1, wherein the intermediate body and the transverse tube are fixedly connected to one another such that they cannot be rotated with respect to one another.

14. The vehicle seat structural component of claim 13, wherein the intermediate body and the transverse tube are connected to one another by a form fit connection.

15. The vehicle seat structural component of claim 14, wherein the first protrusion and the first recess form the form fit connection.

16. The vehicle seat structural component of claim 1, wherein the first protrusion is designed as a folded arched element.

17. The vehicle seat structural component of claim 1, wherein at least one element selected from the following group is formed by elastic-plastic deformation, the group consisting of: the first protrusion, the first recess, the transverse tube supporting section, the second protrusion and the second recess.

18. A vehicle seat including the vehicle seat structural component of claim 1.

19. A vehicle seat structural component for a vehicle seat, comprising:
 a structural element, the structural element including an opening;
 a transverse tube, the transverse tube including an outwardly extending first protrusion, the transverse tube being designed and arranged to extend through the opening; and
 an intermediate body,
 the intermediate body being designed and arranged to fixedly connect the structural element and the transverse tube to one another by a form fit connection such that they cannot be rotated with respect to one another,
 the intermediate body including a transverse tube supporting section, the transverse tube supporting section having the shape of a U forming an inwardly extending first recess, and
 the transverse tube supporting section being designed and arranged to be supported at the transverse tube such that the first protrusion extends into the first recess and the U surrounds the first protrusion.

* * * * *